(12) United States Patent
Shi et al.

(10) Patent No.: US 11,673,363 B2
(45) Date of Patent: Jun. 13, 2023

(54) ROLLABLE DISPLAY PANEL AND MANUFACTURING METHOD THEREOF, AND DISPLAY DEVICE

(71) Applicant: BOE TECHNOLOGY GROUP CO., LTD., Beijing (CN)

(72) Inventors: Yongxiang Shi, Beijing (CN); Paoming Tsai, Beijing (CN); Xuekai Yang, Beijing (CN); Xiongnan Zhang, Beijing (CN); Shuang Du, Beijing (CN); Jiahao Zhang, Beijing (CN); Ziang Han, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 9 days.

(21) Appl. No.: 17/331,747

(22) Filed: May 27, 2021

(65) Prior Publication Data
US 2022/0063235 A1    Mar. 3, 2022

(30) Foreign Application Priority Data
Aug. 25, 2020  (CN) .......................... 202010863001.4

(51) Int. Cl.
| | | |
|---|---|---|
| B32B 3/26 | (2006.01) | |
| B32B 7/022 | (2019.01) | |
| B32B 7/12 | (2006.01) | |
| B32B 17/10 | (2006.01) | |

(52) U.S. Cl.
CPC .............. *B32B 3/263* (2013.01); *B32B 7/022* (2019.01); *B32B 7/12* (2013.01); *B32B 17/10* (2013.01); *B32B 2307/51* (2013.01); *B32B 2307/732* (2013.01); *B32B 2457/20* (2013.01)

(58) Field of Classification Search
CPC ................ B32B 17/10; B32B 2307/51; B32B 2307/732; B32B 2457/20; B32B 3/263; B32B 7/022; B32B 7/12; G09F 9/301; G06F 1/1652; G06F 1/1616; G02F 1/133331; H05K 5/03
See application file for complete search history.

(56) References Cited

U.S. PATENT DOCUMENTS

| | | | | |
|---|---|---|---|---|
| 2015/0049428 | A1* | 2/2015 | Lee ....................... | G06F 1/1652 |
| | | | | 361/679.27 |
| 2016/0209874 | A1* | 7/2016 | Choi ..................... | G06F 1/1652 |
| 2017/0146851 | A1* | 5/2017 | Shi ................... | G02F 1/133526 |
| 2020/0274085 | A1* | 8/2020 | Lee .......................... | B32B 5/16 |

FOREIGN PATENT DOCUMENTS

WO    WO-2020168748 A1 *  8/2020  ........... G06F 1/1652

* cited by examiner

*Primary Examiner* — Alicia J Sawdon
(74) *Attorney, Agent, or Firm* — Xsensus LLP

(57) ABSTRACT

The present disclosure relates to a rollable display panel. The rollable display panel includes a first structure layer, a second structure layer, and a first adhesive layer stacked between the first structure layer and the second structure layer. The rollable display panel is divided into a rollable area, a strain accumulation area, and a flat area distributed in sequence along a rolling direction. A thickness of a part of the first adhesive layer located in the strain accumulation area is greater than a thickness of a part of the first adhesive layer located in the rollable area or the flat area.

9 Claims, 5 Drawing Sheets

ROLLABLE DISPLAY PANEL AND MANUFACTURING METHOD THEREOF, AND DISPLAY DEVICE

CROSS-REFERENCE TO RELATED APPLICATION

This application is based upon, and claims the benefit of and priority to, Chinese Application No. 202010863001.4, filed Aug. 25, 2020, the entire contents of which are incorporated herein by reference.

TECHNICAL FIELD

The present disclosure relates to display technologies and, in particular, to a rollable display device, a method for manufacturing the rollable display device, and a display device.

BACKGROUND

A rollable display panel refers to a flexible display panel that can be curled or rolled along a preset rolling radius. The rollable display panel generally includes a rollable area, a flat area, and a strain accumulation area located between the flat area and the rollable area. The rollable display panel can be rolled in the rollable area, and accordingly a large strain accumulation will occur in the strain accumulation area. Therefore, various structural layers in the rollable display panel are easily detached in the strain accumulation area (i.e., peeling may occur between layers of the rollable display panel).

It should be noted that the information disclosed in the Background section above is only for enhancing the understanding of the background of the present disclosure, and thus may include information that does not constitute prior art known to those of ordinary skill in the art.

SUMMARY

Embodiments of the present disclosure provide a rollable display device, a method for manufacturing the rollable display device, and a display device.

Other characteristics and advantages of the present disclosure will become apparent through the following detailed descriptions, or be learned through the practice of the present disclosure.

According to an aspect of the present disclosure, there is provided a rollable display panel. The display panel includes:
  a first structure layer;
  a second structure layer; and
  a first adhesive layer stacked between the first structure layer and the second structure layer; and
  wherein the rollable display panel is divided into a rollable area, a strain accumulation area, and a flat area distributed in sequence along a rolling direction;
  wherein a thickness of a part of the first adhesive layer located in the strain accumulation area is greater than a thickness of a part of the first adhesive layer located in the rollable area or the flat area.

According to an exemplary embodiment of the present disclosure, an elastic modulus of a part of at least one of the first structure layer and the second structure layer in the strain accumulation area is smaller than an elastic modulus of a part of at least one of the first structure layer and the second structure layer in the rollable area or the flat area.

According to an exemplary embodiment of the present disclosure, the first structure layer is a flexible cover plate, the second structure layer is a flexible array substrate, and an elastic modulus of a part of the flexible cover plate in the strain accumulation area is smaller than an elastic modulus of a part of the flexible cover plate in the rollable area or the flat area.

According to an exemplary embodiment of the present disclosure, the first structure layer is a flexible cover plate, the second structure layer is a flexible array substrate, and the flexible cover plate includes:
  a first ultra-thin glass layer;
  a first polymer thin film; and
  a first hardening layer;
  the first ultra-thin glass layer is arranged on a side of the first adhesive layer away from the flexible array substrate;
  the first polymer thin film is arranged on a side of the first ultra-thin glass layer away from the flexible array substrate;
  the first hardening layer is arranged on a side of the first polymer thin film away from the flexible array substrate; a side of the first ultra-thin glass layer facing the first polymer thin film has a rolling edge which is used for rolling and has a chamfer.

According to an exemplary embodiment of the present disclosure, the chamfer is a curved chamfer or a flat chamfer.

According to an exemplary embodiment of the present disclosure, the chamfer extends to a side of the first ultra-thin glass layer away from the first polymer thin film.

According to an exemplary embodiment of the present disclosure, the flexible cover plate further includes:
  a second adhesive layer arranged between the first ultra-thin glass layer and the first polymer thin film.

According to an exemplary embodiment of the present disclosure, the first structure layer is a flexible cover plate, the second structure layer is a flexible array substrate, and the flexible cover plate includes:
  a second ultra-thin glass layer;
  a second polymer thin film; and
  a second hardening layer;
  the second ultra-thin glass layer is arranged on a side of the first adhesive layer away from the flexible array substrate; the second polymer thin film is arranged on a side of the second ultra-thin glass layer away from the flexible array substrate; the second hardening layer is arranged on a side of the second polymer thin film away from the flexible array substrate; a thickness of a part of the second ultra-thin glass layer in the rollable area is smaller than a thickness of a part of the second ultra-thin glass layer in the flat area or the strain accumulation area.

According to an exemplary embodiment of the present disclosure, a side of the second ultra-thin glass layer facing the second polymer thin film has a recessed structure located in the rollable area.

According to an exemplary embodiment of the present disclosure, the flexible cover plate further includes:
  a third polymer thin film arranged on a side of the second ultra-thin glass layer facing the flexible array substrate;
  wherein a side of the second ultra-thin glass layer facing the third polymer thin film has a recessed structure located in the rollable area.

According to an exemplary embodiment of the present disclosure, a side of the second ultra-thin glass layer facing the second polymer thin film has a rolling edge which is used for rolling and has a chamfer.

According to an exemplary embodiment of the present disclosure, the first ultra-thin glass layer is a hardened ultra-thin glass layer.

According to another aspect of the present disclosure, there is provided a method for manufacturing a rollable display panel, wherein the rollable display panel is divided into a rollable area, a strain accumulation area, and a flat area distributed in sequence along a rolling direction, and the manufacturing method includes:

providing a second structural layer;

forming a first adhesive layer on a side of the second structural layer, wherein a thickness of a part of the first adhesive layer located in the strain accumulation area is greater than a thickness of a part of the first adhesive layer located in the rollable area or the flat area; and forming a first structure layer and attaching the first structure layer to a side of the first adhesive layer away from the second structure layer.

According to an exemplary embodiment of the present disclosure, the first structure layer is a flexible cover plate, and the second structure layer is a flexible array substrate;

wherein forming the flexible cover plate includes:

forming a resin material layer; and curing different positions of the resin material layer to different degrees to form the resin material layer into the flexible cover plate;

wherein a curing degree of a part of the flexible cover plate in the strain accumulation area is smaller than a curing degree of a part of the flexible cover plate in the rollable area or the flat area.

According to an exemplary embodiment of the present disclosure, the first structure layer is a flexible cover plate, and the second structure layer is a flexible array substrate;

wherein forming the flexible cover plate includes:

forming a first ultra-thin glass layer, wherein a first side of the first ultra-thin glass layer has a rolling edge which is used for rolling and has a chamfer;

forming a first polymer thin film on a side of the first ultra-thin glass layer; and forming a first hardening layer on a side of the first polymer thin film away from the first ultra-thin glass layer;

wherein attaching the flexible cover plate to a side of the first adhesive layer away from the flexible array substrate includes:

attaching a side of the first ultra-thin glass layer away from the first polymer thin film to the side of the first adhesive layer away from the flexible array substrate.

According to an exemplary embodiment of the present disclosure, forming the first ultra-thin glass layer includes:

providing a glass material layer;

thinning the glass material layer; and reinforcing the thinned glass material layer to form the first ultra-thin glass layer.

According to an exemplary embodiment of the present disclosure, the first structure layer is a flexible cover plate, and the second structure layer is a flexible array substrate;

wherein forming the flexible cover plate, includes:

forming a second ultra-thin glass layer, wherein a thickness of a part of the second ultra-thin glass layer in the rollable area is smaller than a thickness of a part of the second ultra-thin glass layer in the flat area or the strain accumulation area;

forming a second polymer thin film on a side of the second ultra-thin glass layer; and forming a second hardening layer on a side of the second polymer thin film away from the second ultra-thin glass layer;

wherein attaching the flexible cover plate to a side of the first adhesive layer away from the flexible array substrate includes:

attaching a side of the second ultra-thin glass layer away from the second polymer thin film to the side of the first adhesive layer away from the flexible array substrate.

According to an exemplary embodiment of the present disclosure, a side of the second ultra-thin glass layer facing the second polymer thin film has a recessed structure located in the rollable area.

According to an exemplary embodiment of the present disclosure, a side of the second ultra-thin glass layer away from the second polymer thin film has a recessed structure located in the rollable area;

wherein forming the flexible cover plate further includes:

forming a third polymer thin film on a side of the second ultra-thin glass layer away from the second polymer thin film;

wherein attaching the flexible cover plate to a side of the first adhesive layer away from the flexible array substrate includes:

attaching a side of the third polymer thin film away from the second ultra-thin glass layer to the side of the first adhesive layer away from the flexible array substrate.

According to another aspect of the present disclosure, there is provided a display device includes the display panel as described above.

It should be understood that the above general description and the following detailed description are only exemplary and explanatory, and should not be considered as constituting any limitations on the present disclosure.

BRIEF DESCRIPTION OF THE DRAWINGS

The drawings, which are incorporated into the specification and constitute a part of the specification, show embodiments in accordance with the disclosure, and are used to explain the principles of the disclosure together with the specification.

DETAILED DESCRIPTION

Figure 1:
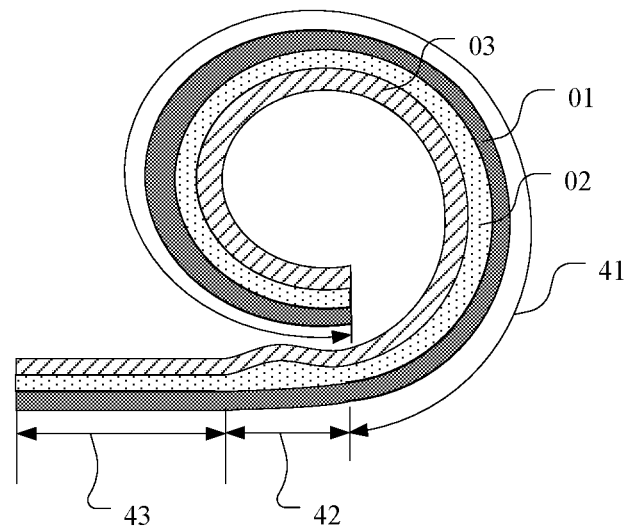
FIG. 1 is a schematic diagram of a structure of a rollable display panel in a related art.

Example embodiments will now be described more fully with reference to the accompanying drawings. However, the embodiments can be implemented in a variety of forms and should not be construed as being limited to the examples set forth herein; rather, these embodiments are provided so that the present disclosure will be more complete so as to convey the idea of the exemplary embodiments to those skilled in this art. The same reference signs in the drawings indicate the same or similar structures, and thus their repeated descriptions will be omitted.

Although relative terms such as "upper" and "lower" are used herein to describe the relative relationship between one component in the drawings and another component, these terms are used for convenience in description, for example, and are based on the directions of the example described in the drawings. It can be understood that if a device shown in the drawings is turned upside down, a component described as "upper" will become a "lower" component. Other relative terms, such as "high", "low", "top", "bottom", "left" and "right" have similar meanings. When a structure is "on" another structure, it may mean that the certain structure is integrally formed on another structure, or that the structure is "directly" installed on another structure, or that the structure is "indirectly" installed on another structure through other structures.

The terms "a", "an", and "said" are used to indicate the presence of one or more elements/components, and so on; the terms "include" and "have" are open terms and means inclusive, and refers to that in addition to the listed elements/components and so on, there may be other elements/components and so on.

FIG. 1 is a schematic structural diagram of a rollable display panel in a related art. The rollable display panel includes a flexible cover plate 01, a flexible array substrate 03, and an adhesive layer 02 between the flexible array substrate 03 and the flexible cover 01. As shown in FIG. 1, the rollable display panel includes a rollable area 41, a strain accumulation area 42, and a flat area 43. The rollable display panel is rolled in the rollable area 41. When the rollable display panel is rolled, the lengths of the flexible cover plate 01 and the flexible array substrate 03 on the roll path are different, which will cause greater strain accumulation in the strain accumulation area 42. As shown in FIG. 1, the strain accumulation will cause the flexible array substrate 03 and the adhesive layer 02 to protrude toward the inner side of the rolled display panel in the strain accumulation area 42, which will cause the peeling of the flexible cover plate 01 and the flexible array substrate 03 in the strain accumulation area 42.

Figure 2:
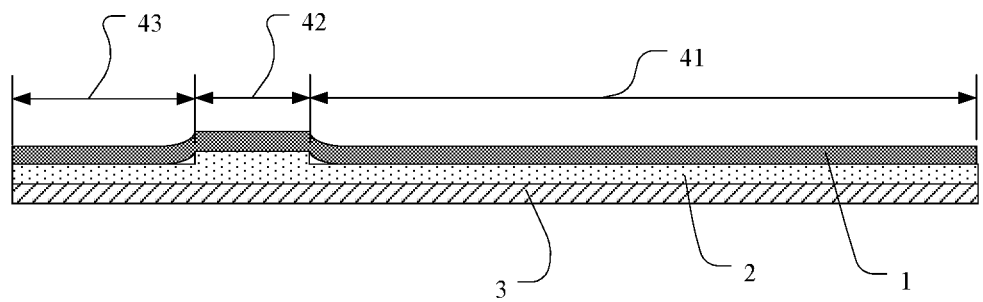
FIG. 2 is a schematic structural diagram of a rollable display panel according to an exemplary embodiment of the present disclosure.

In view of the above, an embodiment of the present disclosure provides a rollable display panel. FIG. 2 is a schematic structural diagram of a rollable display panel according to an exemplary embodiment of the present disclosure. The rollable display panel includes a first structure layer 1, a second structure layer 3, and a first adhesive layer 2 laminated between the first structure layer 1 and the second structure layer 3. The rollable display panel may be divided into a rollable area 41, a strain accumulation area 42, and a flat area 43 sequentially distributed in the rolling direction. The thickness of a part of the first adhesive layer 2 in the strain accumulation area 42 is greater than the thickness of a part of the first adhesive layer 2 in the rollable area 41 and the flat area 43.

The rollable display panel according to embodiments of the present disclosure includes a first structure layer, a second structure layer, and a first adhesive layer stacked between the first structure layer and the second structure layer. The rollable display panel is divided into a rollable area, a strain accumulation area, and a flat area distributed in sequence along a rolling direction. The thickness of a part of the first adhesive layer located in the strain accumulation area is greater than the thickness of a part of the first adhesive layer located in the rollable area or the flat area. The first adhesive layer in the strain accumulation area has a relatively large thickness and can thus absorb more stress accumulation, thereby reducing the risk of peeling between layers of the rollable display panel.

In the rollable display panel, the first adhesive layer 2 can absorb the amount of strain in the strain accumulation area along the rolling direction. The thickness of the first adhesive layer is positively related to its ability to absorb the amount of strain. The rollable display panel can absorb more stress accumulation by increasing the thickness of the first adhesive layer in the strain accumulation area, thereby reducing the risk of peeling of layers of the rollable display panel.

In an exemplary embodiment, the first structure layer may be a flexible cover plate, and the second structure layer may be a flexible array substrate. It should be understood that in some other exemplary embodiments, the first structure layer and the second structure layer may also have other structures. For example, the first structure layer may be a supporting film, and the second structure layer may be a metal supporting layer.

The following are examples of how to set the thickness of the first adhesive layer in the strain accumulation area. In a rollable display panel with a rolling radius r of 5 mm, the length of the strain accumulation area along the rolling direction can be 20 mm. When the rollable display panel is rolled as one circle, the theoretical strain accumulation amount of the flexible cover plate and the flexible array substrate is 0.8 mm. The first adhesive layer can be an optical adhesive layer (for example, clear adhesive). When the thickness of the first adhesive layer is the same in the rollable area, the strain accumulation area, and the flat area, the first adhesive layer can absorb a strain accumulation amount of 0.6 mm. According to formula $0.6/2\pi r$, it can be calculated that the strain rate per unit size that the first adhesive layer can absorb is about 2%. Then, the strain absorption amount of the first adhesive layer in the strain accumulation area can be calculated as 0.4 mm according to the formula 20 mm*2%. If it is needed to absorb the excess strain accumulation amount of 0.2 mm through the first adhesive layer in the strain accumulation area, the strain absorption amount in the strain accumulation area should be 0.6 mm, for example. Since the thickness of the first adhesive layer has a linear relationship with its ability to absorb strain accumulation amount, it is needed to increase the thickness of the first adhesive layer in the strain accumulation area to 1.5 times the original thickness.

In an exemplary embodiment, an elastic modulus of a part of at least one of the first structure layer 1 and the second structure layer 3 in the strain accumulation area is smaller than an elastic modulus of a part of at least one of the first structure layer 1 and the second structure layer 3 in the rollable area or the flat area. This arrangement can increase the flexibility of the first structural layer 1 and/or the second structural layer 3 by reducing the elastic modulus of the first structural layer 1 and/or the second structural layer 3 in the strain accumulation area, thereby increasing the strain amount of the first structural layer 1 and/or the second structural layer 3 to reduce the strain accumulation amount of the first structural layer 1 and the second structural layer 3.

For example, when the first structure layer is a flexible cover plate and the second structure layer is a flexible array substrate, the elastic modulus of a part of the flexible cover plate in the strain accumulation area can be set to be smaller than the elastic modulus of a part of the flexible cover plate in the rollable area and the flat area.

The following are examples of how to set the elastic modulus of the flexible cover plate in the strain accumulation area. When the rollable display panel is rolled as one circle, the theoretical strain accumulation amount of the flexible cover plate and the flexible array substrate can be 0.8 mm, the first adhesive layer can absorb the strain accumulation amount of 0.6 mm, and the length of the strain accumulation area along the rolling direction can be 20 mm. If the excess 0.2 mm strain accumulation amount is absorbed by the flexible cover plate in the strain accumulation area, the amount of strain absorbed per unit size by the flexible cover plate in the strain accumulation area needs to be changed from 0.15 to 0.25. Since the bending ability of the flexible cover plate has a linear relationship with its ability to absorb the accumulated strain amount, the excess 0.2 mm strain accumulation amount can be completely absorbed by the flexible cover plate by changing the elastic modulus of the flexible cover plate in the strain accumulation area to 0.6 times its original elastic modulus.

In an exemplary embodiment, the different thicknesses of the first adhesive layer in the strain accumulation area and in the rollable are or the flat area can be formed through a patterning process, or can be formed by extrusion using molds.

In an exemplary embodiment, the method for manufacturing the rollable display panel may include, first, forming a flexible cover plate, a first adhesive layer, and a flexible array substrate and, then, attaching the flexible cover plate, the first adhesive layer, and the flexible array substrate to each other to form a rollable display panel.

Figure 3:
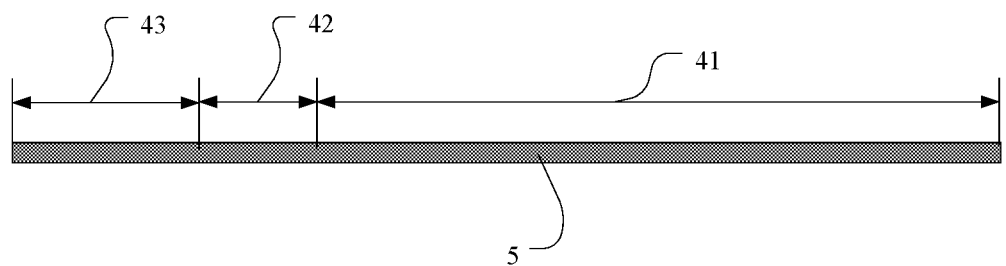
FIG. 3 is a schematic diagram of a method for manufacturing a flexible cover plate in a rollable display panel according to an exemplary embodiment of the present disclosure.

In an exemplary embodiment, the flexible cover plate may be a resin layer. FIG. 3 is a schematic diagram of a manufacturing method of a flexible cover in a rollable display panel according to an exemplary embodiment of the present disclosure. Forming the flexible cover plate may include the following steps:

A resin material layer 5 is formed. The material of the resin material layer 5 may include one or more of the following resin materials: transparent polyimide, polyethylene terephthalate (PET), polyethylene naphthalate (PEN), thermoplastic polyurethane (TPU), polyaramid, polyethylene (PE), polypropylene (PP), polymethyl methacrylate (PMMA), and so forth. The resin material layer 5 is cured to different degrees at different positions to form the resin material layer 5 into the flexible cover plate. The curing degree of a part of the flexible cover plate in the strain accumulation area 42 is smaller than the curing degree of a part of the flexible cover plate in the rollable area 41 and the flat area 43. In this exemplary embodiment, the method for curing the resin material layer 5 may include ultraviolet curing, thermal curing, and the like.

Figure 4:
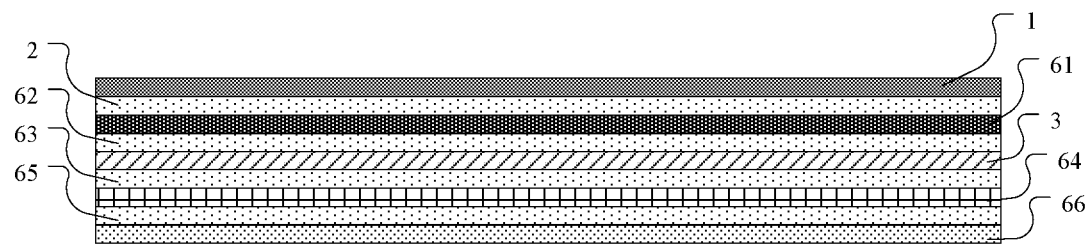
FIG. 4 is a schematic structural diagram of a rollable display panel according to an exemplary embodiment of the present disclosure.

FIG. 4 is a schematic structural diagram of a rollable display panel according to another exemplary embodiment of the present disclosure. The rollable display panel may further include a third adhesive layer 62, a fourth adhesive layer 63, a fifth adhesive layer 65, an optical functional layer 61, a supporting film 64, and a metal supporting layer 66. The flexible cover plate 1, the first adhesive layer 2, the optical functional layer 61, the third adhesive layer 62, the flexible array substrate 3, the fourth adhesive layer 63, the supporting film 64, the fifth adhesive layer 65, and the metal supporting layer 66 are stacked in sequence. The thickness of a part of at least one of the first adhesive layer 2, the third adhesive layer 62, the fourth adhesive layer 63, and the fifth adhesive layer 65 in the strain accumulation area 42 may be greater than that in the rollable area 41 and the flat area 43. The optical functional layer 61 may be a polarizer.

Figure 5:
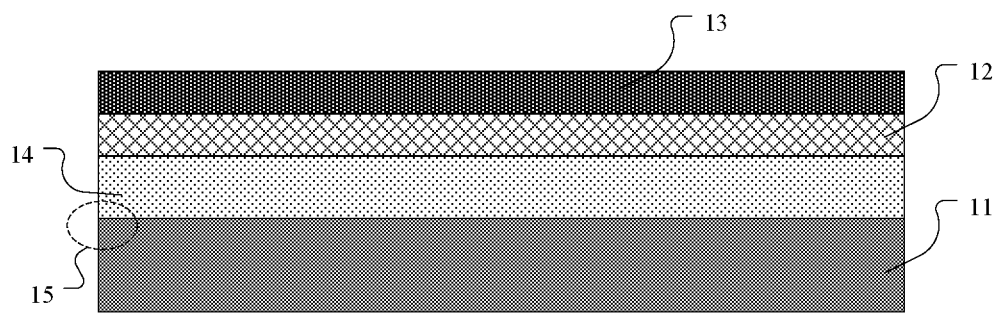
FIG. 5 is a schematic diagram showing the structure of a flexible cover plate in a related art.

FIG. 5 is a schematic diagram of the structure of a flexible cover plate in a related art. The flexible cover plate may include: a first ultra-thin glass layer 11, an adhesive layer 14, a first polymer thin film 12, and a first hardening layer 13 stacked in sequence. As shown by the dashed circle 15 in FIG. 5, a side of the first ultra-thin glass layer 11 facing the first polymer thin film 12 has a rolling edge which is used for rolling and has a right-angle structure. As shown in FIG. 5, the rolling direction of the flexible cover plate may be perpendicular to the cross section shown in FIG. 5. Since the first ultra-thin glass layer 11 is a fragile structure, when the first ultra-thin glass layer 11 is bent, the stress generated by the bending of the flexible cover is likely to concentrate on the right angle of the right-angle structure at indicated by the dashed circle 15, resulting in damage of the first ultra-thin glass layer 11.

Figure 6:
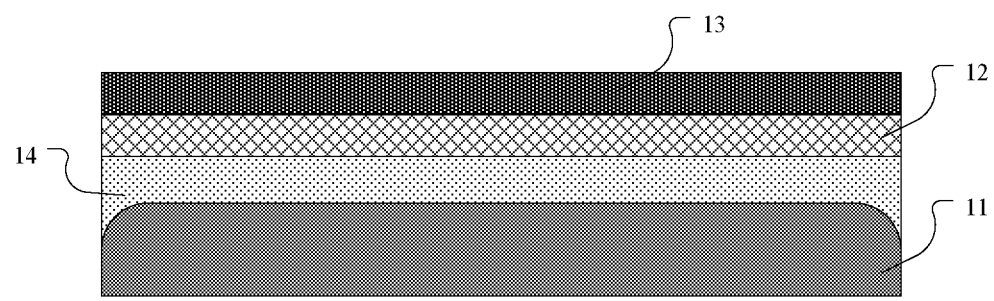
FIG. 6 is a schematic structural diagram of a flexible cover plate in a rollable display panel according to an exemplary embodiment of the present disclosure.

FIG. 6 is a schematic structural diagram of a flexible cover plate in a rollable display panel according to an exemplary embodiment of the present disclosure. The flexible cover plate may include: a first ultra-thin glass layer 11, a first polymer thin film 12, and a first hardened layer 13. The first ultra-thin glass layer 11 may be arranged on a side of the first adhesive layer away from the flexible array substrate. The first polymer thin film 12 is arranged on a side of the first ultra-thin glass layer away from the flexible array substrate. The first hardening layer 13 is arranged on a side of the first polymer thin film 12 away from the flexible array substrate. A side (or surface) of the first ultra-thin glass layer 11 facing the first polymer thin film 12 has a rolling edge which is used for rolling and has a chamfer. This arrangement can disperse the stress on the rolling edge on the side of the first ultra-thin glass layer 11 facing the first polymer thin film 12, thereby reducing the risk of damage to the first ultra-thin glass layer. The first polymer thin film has a strong bending ability to facilitate bending of the flexible cover plate. However, the first polymer thin film is prone to permanent deformation under a high temperature and high humidity environment. The first ultra-thin glass layer 11 may be an inorganic material and has a strong recovery ability, thereby improving the recovery ability of the flexible cover plate. The first hardening layer 13 has a relatively large pencil hardness to increase the pencil hardness on the surface of the flexible cover plate. The material of the first polymer film 12 may include one or more of the following materials: transparent polyimide (CPI), polyethylene terephthalate (PET), polyethylene naphthalate (PEN), thermoplastic polyurethane (TPU), or the like. The material of the first hardening layer 13 may include one or more of siloxane and acrylate. The first polymer thin film 12 can be selected from a material with a refractive index similar to that of the first ultra-thin glass layer, so as to avoid light refraction between the first ultra-thin glass layer and the first polymer thin film.

In this exemplary embodiment, as shown in FIG. 6, the chamfer may be a curved chamfer. It should be understood that in some other exemplary embodiments, the chamfer may also be a flat chamfer.

Figure 7:
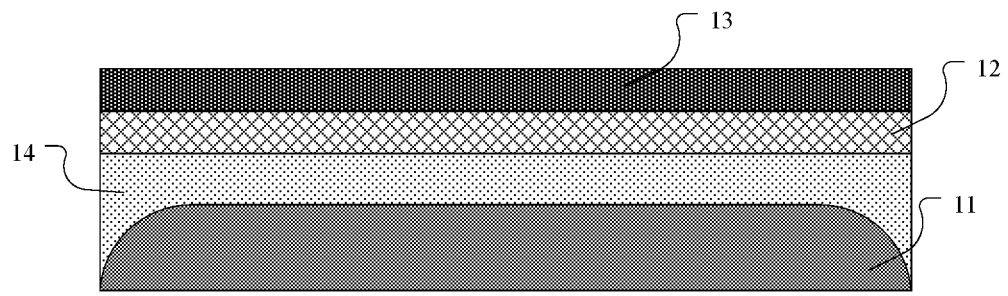
FIG. 7 is a schematic structural diagram of a flexible cover plate in a rollable display panel another exemplary embodiment of the present disclosure.

FIG. 7 is a schematic structural diagram of a flexible cover plate in a rollable display panel according to an exemplary embodiment of the present disclosure. The chamfer extends to a side of the first ultra-thin glass layer 11 away from the first polymer thin film.

In an exemplary embodiment, as shown in FIGS. 6 and 7, the flexible cover plate further may further include a second adhesive layer 14, which is arranged between the first ultra-thin glass layer 11 and the first polymer thin film 12. The second adhesive layer 14 may be a pressure sensitive adhesive. It should be understood that the second adhesive layer 14 may not be provided between the first ultra-thin glass layer 11 and the first polymer thin film 12, and the first polymer film 12 may be directly formed on the first ultra-thin glass layer 11 by a coating processing. On one hand, this arrangement can fill the cracks on the first ultra-thin glass layer 11 with the first polymer, thereby improving the strength of the first ultra-thin glass layer 11. On the other hand, omitting the soft second adhesive layer from the flexible cover plate may improve the overall rigidity of the flexible cover.

Figure 8:
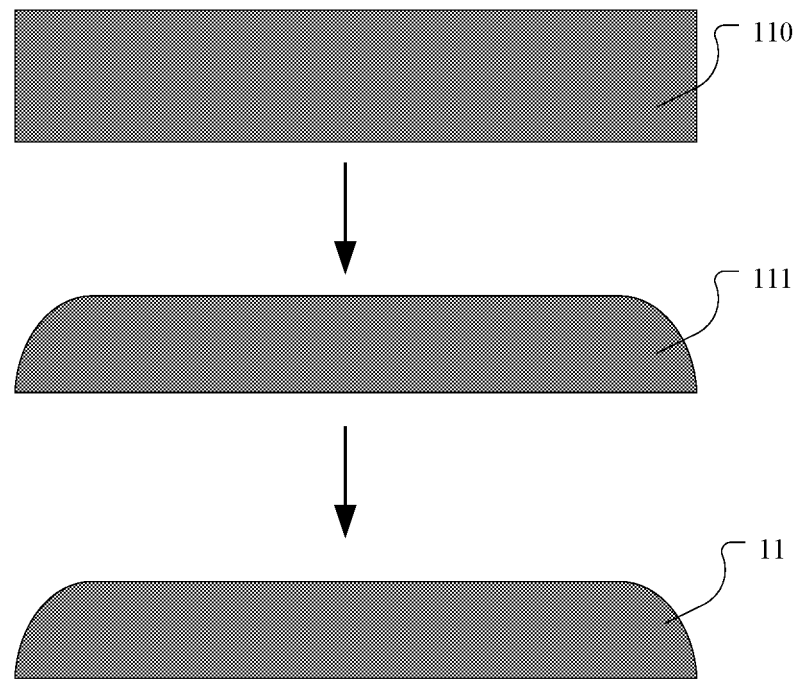
FIG. 8 is a schematic diagram of a manufacturing process of a first ultra-thin glass layer in a rollable display panel according to an exemplary embodiment of the present disclosure.

In an exemplary embodiment, the first ultra-thin glass layer may be a reinforced glass layer. FIG. 8 is a schematic diagram of the manufacturing process of the first ultra-thin glass layer in the rollable display panel according to an exemplary embodiment of the present disclosure. The manufacturing method of the first ultra-thin glass layer may include:

providing a glass material layer 110;

thinning the glass material layer 110 to obtain a semi-finished product 111; and reinforcing the thinned glass material layer to form the first ultra-thin glass layer 11.

Figure 9:
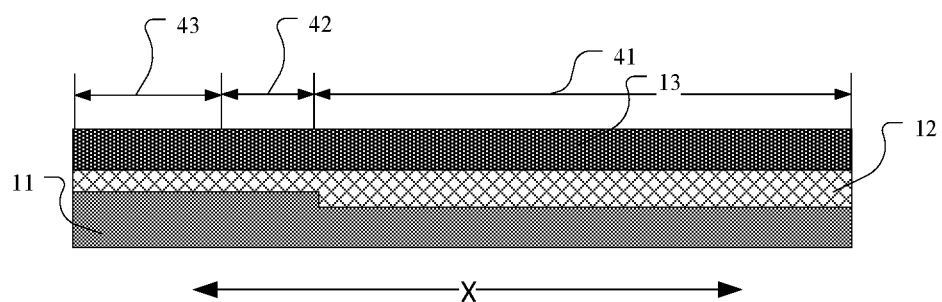
FIG. 9 is a schematic structural diagram of a flexible cover plate in a rollable display panel according to an exemplary embodiment of the present disclosure.

FIG. 9 is a schematic structural diagram of a flexible cover plate in a rollable display panel according to an exemplary embodiment of the present disclosure. The flexible cover plate may include: a second ultra-thin glass layer 11, a second polymer thin film 12, and a second hardening layer 13. The second ultra-thin glass layer 11 is arranged on a side of the first adhesive layer away from the flexible array substrate. The second polymer thin film 12 is arranged on a side of the second ultra-thin glass layer away from the flexible array substrate. The second hardening layer 13 is arranged on a side of the second polymer thin film 12 away from the flexible array substrate. The thickness of a part of the second ultra-thin glass layer 11 in the rollable area 41 is smaller than a thickness of a part of the second ultra-thin glass layer 11 in the flat area 43 or the strain accumulation area 42. By thinning the second ultra-thin glass layer 11 in the rollable area 41, it is convenient for the bending of the second ultra-thin glass layer 11 in the rollable area 41. As shown in FIG. 9, the X direction is the rolling direction of the flexible cover plate.

The second polymer thin film has a strong bending ability to facilitate the bending of the flexible cover plate. However, the second polymer film is prone to permanent deformation under high temperature and high humidity environment. The second ultra-thin glass layer may be inorganic material and has a strong recovery ability, so as to facilitate the recovery of the flexible cover plate. The second hardening layer 13 has a relatively large pencil hardness to increase the pencil hardness on the surface of the flexible cover plate. The material of the second polymer film 12 may include one or more of the following materials: transparent polyimide (CPI), polyethylene terephthalate (PET), polyethylene naphthalate (PEN), or thermoplastic polyurethane (TPU), or the like. The material of the second hardening layer 13 may include one or more of siloxane and acrylate. The second polymer thin film 12 can be selected from a material with a refractive index similar to that of the first ultra-thin glass layer, so as to avoid light refraction between the first ultra-thin glass layer and the second polymer thin film.

The second polymer thin film 12 may be directly formed on the second ultra-thin glass layer 11 through a coating process. On one hand, this arrangement can fill the cracks on the second ultra-thin glass layer 11 with the second polymer, thereby improving the strength of the second ultra-thin glass layer 11. On the other hand, the flexible cover plate avoids the arrangement of the soft adhesive layer between the second ultra-thin glass layer and the second polymer thin film, thereby improving the overall rigidity of the flexible cover plate.

Figure 10:
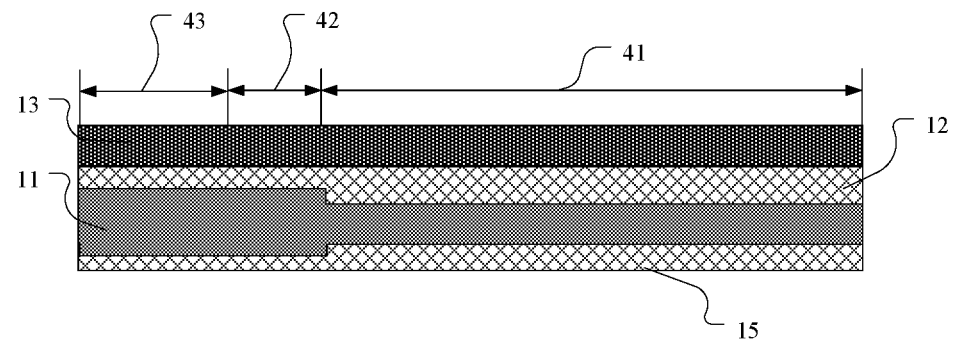
FIG. 10 is a schematic structural diagram of a flexible cover plate in a rollable display panel according to an exemplary embodiment of the present disclosure.

In an exemplary embodiment, as shown in FIG. 9, a side (or surface) of the second ultra-thin glass layer 11 facing the second polymer thin film 12 has a recessed structure located in the rollable area, so that the thickness of the second ultra-thin glass layer 11 in the rollable area 41 is smaller than the thickness of the second ultra-thin glass layer 11 in the flat area 43 and the strain accumulation area 42. FIG. 10 is a schematic structural diagram of a flexible cover plate in a rollable display panel according to another exemplary embodiment of the present disclosure. The flexible cover plate may further include a third polymer film 15 arranged on a side of the second ultra-thin glass layer 11 facing the flexible array substrate. A side of the second ultra-thin glass layer 11 facing the third polymer thin film 15 has a recessed structure located in the rollable area, so that the thickness of the portion of the second ultra-thin glass layer 11 located in the rollable area 41 is further reduced.

It should be understood that, in the flexible cover shown in FIGS. 9 and 10, a side of the second ultra-thin glass layer 11 facing the second polymer thin film 12 may have a rolling edge which is used for rolling and has a chamfer.

In an exemplary embodiment, each adhesive layer in the rollable display panel may be an optical adhesive layer or a pressure-sensitive adhesive layer.

Figure 11:
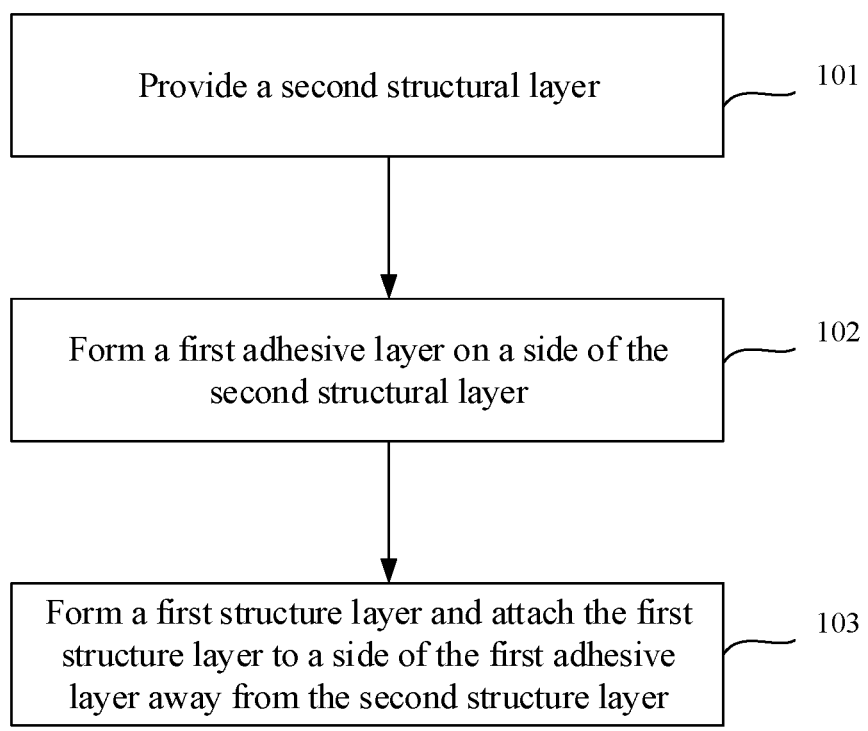
FIG. 11 is a flow chart showing a method for manufacturing a rollable display panel according to an exemplary embodiment of the present disclosure.

FIG. 11 is a flow chart showing a method for manufacturing a rollable display panel according to an exemplary embodiment of the present disclosure.

The rollable display panel is divided into a rollable area, a strain accumulation area, and a flat area distributed in sequence along a rolling direction. The manufacturing method includes the following steps:

In step 101, a second structural layer is provided.

In step 102, a first adhesive layer is formed on a side of the second structural layer. T thickness of a part of the first adhesive layer located in the strain accumulation area is greater than a thickness of a part of the first adhesive layer located in the rollable area or the flat area.

In step 103, a first structure layer is formed and attached the to a side of the first adhesive layer away from the second structure layer.

According to an exemplary embodiment of the present disclosure, the first structure layer is a flexible cover plate, and the second structure layer is a flexible array substrate;

wherein forming the flexible cover plate includes:

forming a resin material layer; and curing different positions of the resin material layer to different degrees to form the resin material layer into the flexible cover plate;

wherein a curing degree of a part of the flexible cover plate in the strain accumulation area is smaller than a curing degree of a part of the flexible cover plate in the rollable area or the flat area.

According to an exemplary embodiment of the present disclosure, the first structure layer is a flexible cover plate, and the second structure layer is a flexible array substrate;

wherein forming the flexible cover plate includes:

forming a first ultra-thin glass layer, wherein a first side of the first ultra-thin glass layer has a rolling edge which is used for rolling and has a chamfer;

forming a first polymer thin film on a side of the first ultra-thin glass layer; and forming a first hardening layer on a side of the first polymer thin film away from the first ultra-thin glass layer;

wherein attaching the flexible cover plate to a side of the first adhesive layer away from the flexible array substrate includes:

attaching a side of the first ultra-thin glass layer away from the first polymer thin film to the side of the first adhesive layer away from the flexible array substrate.

According to an exemplary embodiment of the present disclosure, forming the first ultra-thin glass layer includes:

providing a glass material layer;

thinning the glass material layer; and reinforcing the thinned glass material layer to form the first ultra-thin glass layer.

According to an exemplary embodiment of the present disclosure, the first structure layer is a flexible cover plate, and the second structure layer is a flexible array substrate;

wherein forming the flexible cover plate, includes:

forming a second ultra-thin glass layer, wherein a thickness of a part of the second ultra-thin glass layer in the rollable area is smaller than a thickness of a part of the second ultra-thin glass layer in the flat area or the strain accumulation area;

forming a second polymer thin film on a side of the second ultra-thin glass layer; and forming a second hardening layer on a side of the second polymer thin film away from the second ultra-thin glass layer;

wherein attaching the flexible cover plate to a side of the first adhesive layer away from the flexible array substrate includes:

attaching a side of the second ultra-thin glass layer away from the second polymer thin film to the side of the first adhesive layer away from the flexible array substrate.

According to an exemplary embodiment of the present disclosure, a side of the second ultra-thin glass layer facing the second polymer thin film has a recessed structure located in the rollable area.

According to an exemplary embodiment of the present disclosure, a side of the second ultra-thin glass layer away from the second polymer thin film has a recessed structure located in the rollable area;

wherein forming the flexible cover plate further includes:

forming a third polymer thin film on a side of the second ultra-thin glass layer away from the second polymer thin film;

wherein attaching the flexible cover plate to a side of the first adhesive layer away from the flexible array substrate includes:

attaching a side of the third polymer thin film away from the second ultra-thin glass layer to the side of the first adhesive layer away from the flexible array substrate.

The manufacturing method of the rollable display panel has been described in detail in the foregoing descriptions, and details will not be repeated here.

An exemplary embodiment of the present disclosure further provides a display device including the above-mentioned display panel. The display device may be a display device such as a mobile phone, a tablet computer, or a television, or the like.

Those skilled in the art will easily think of other embodiments of the present disclosure after considering the specification and practicing the invention disclosed herein. The present disclosure is intended to cover any variations, uses, or adaptive changes of the present disclosure. These variations, uses, or adaptive changes follow the general principles of the present disclosure and include common knowledge or conventional technical means in the technical field that are not disclosed in the present disclosure. The description and embodiments are exemplary, and the scope and spirit of the present disclosure are defined by the appended claims.

It should be understood that the present disclosure is not limited to the precise structures that have been described above and shown in the drawings, and various modifications and changes can be made without departing from the spirit of the present disclosure, and the scope of the present disclosure is defined by the appended claims.

What is claimed is:

1. A rollable display panel, comprising:
    a first structure layer;
    a second structure layer; and
    a first adhesive layer stacked between the first structure layer and the second structure layer; and
    wherein the rollable display panel is divided into a rollable area, a strain accumulation area, and a flat area distributed in sequence along a rolling direction; and
    wherein a thickness of a part of the first adhesive layer located in the strain accumulation area is greater than a thickness of a part of the first adhesive layer located in the rollable area and is also greater than a thickness of a part of the first adhesive layer located in the flat area;
    wherein:
    the first structure layer is a flexible cover plate, the second structure layer is a flexible array substrate, and the flexible cover plate comprises:
        a first ultra-thin glass layer arranged on a side of the first adhesive layer away from the flexible array substrate;
        a first polymer thin film arranged on a side of the first ultra-thin glass layer away from the flexible array substrate; and
        a first hardening layer arranged on a side of the first polymer thin film away from the flexible array substrate; and
    a side of the first ultra-thin glass layer facing the first polymer thin film has a rolling edge which is used for rolling and has a chamfer;
    wherein the chamfer extends to a surface of the first ultra-thin glass layer away from the first polymer thin film.

2. The rollable display panel according to claim 1, wherein an elastic modulus of a part of at least one of the first structure layer and the second structure layer in the strain accumulation area is smaller than an elastic modulus of a part of at least one of the first structure layer and the second structure layer in the rollable area or the flat area.

3. The rollable display panel according to claim 2, wherein the first structure layer is a flexible cover plate, the second structure layer is a flexible array substrate, and an elastic modulus of a part of the flexible cover plate in the strain accumulation area is smaller than an elastic modulus of a part of the flexible cover plate in the rollable area or the flat area.

4. The rollable display panel according to claim 1, wherein the chamfer is a curved chamfer or a flat chamfer.

5. The rollable display panel according to claim 1, wherein the flexible cover plate further comprises a second adhesive layer arranged between the first ultra-thin glass layer and the first polymer thin film.

6. The rollable display panel according to claim 1, wherein:
a thickness of a part of the first ultra-thin glass layer in the rollable area is smaller than a thickness of a part of the first ultra-thin glass layer in the flat area or the strain accumulation area.

7. The rollable display panel according to claim 6, wherein a side of the first ultra-thin glass layer facing the first polymer thin film has a recessed structure located in the rollable area.

8. The rollable display panel according to claim 7, wherein:
the flexible cover plate further comprises a third polymer thin film arranged on a side of the first ultra-thin glass layer facing the flexible array substrate; and
a side of the first ultra-thin glass layer facing the third polymer thin film has a recessed structure located in the rollable area.

9. A display device, comprising:
a rollable display panel, comprising:
a first structure layer;
a second structure layer; and
a first adhesive layer stacked between the first structure layer and the second structure layer; and
wherein the rollable display panel is divided into a rollable area, a strain accumulation area, and a flat area distributed in sequence along a rolling direction; and
wherein a thickness of a part of the first adhesive layer located in the strain accumulation area is greater than a thickness of a part of the first adhesive layer located in the rollable area and is also greater than a thickness of a part of the first adhesive layer located in the flat area;
wherein:
the first structure layer is a flexible cover plate, the second structure layer is a flexible array substrate, and the flexible cover plate comprises:
a first ultra-thin glass layer arranged on a side of the first adhesive layer away from the flexible array substrate;
a first polymer thin film arranged on a side of the first ultra-thin glass layer away from the flexible array substrate; and
a first hardening layer arranged on a side of the first polymer thin film away from the flexible array substrate; and
a side of the first ultra-thin glass layer facing the first polymer thin film has a rolling edge which is used for rolling and has a chamfer;
wherein the chamfer extends to a surface of the first ultra-thin glass layer away from the first polymer thin film.

* * * * *